VARIABLE GAIN AMPLIFIERS

Filed Dec. 22, 1958

INVENTOR:
Michael Walter Hill
BY:
Baldwin & Wight
his ATTORNEYS 3,001,148
Patented Sept. 19, 1961

3,001,148

VARIABLE GAIN AMPLIFIERS

Michael Walter Hill, Chelmsford, England, assignor to Marconi's Wireless Telegraph Company Limited, London, England, a British company Filed Dec. 22, 1958, Ser. No. 782,149
Claims priority, application Great Britain Jan. 9, 1958
2 Claims. (Cl. 330—86)

This invention relates to variable gain amplifiers and has for its object to provide improved and simple variable gain amplifiers which will give a wide variation of gain, and a useful maximum gain without objectionable variation of band width as the gain control is adjusted. Though not limited to its application thereto the invention is primarily intended for and particularly advantageous in video frequency amplifiers where the problem of obtaining wide variation of gain with good maximum gain and without serious variation of band width is difficult to solve.

Figure 1:
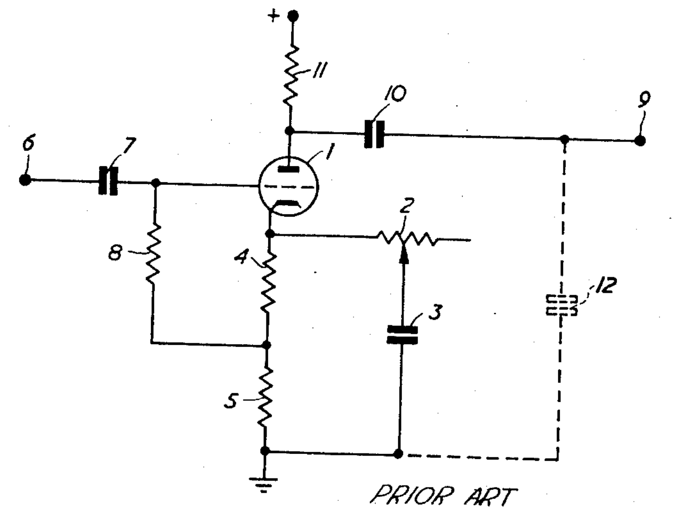
Figure 2:
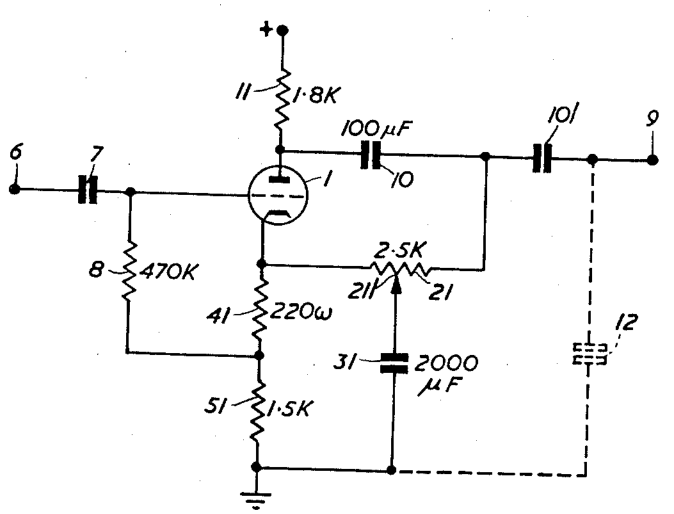

The invention is illustrated in and explained in connection with the accompanying diagrammatic drawings in which FIGURE 1 is an explanatory diagram showing a well known form of variable gain amplifier, and FIGURE 2 is a diagram of one embodiment of this invention. In FIGURE 2 practical values of circuit elements are given by way of example.

Referring to FIGURE 1 the well known variable gain amplifier stage therein shown comprises a valve 1, exemplified as a triode, having a variable current-feedback resistance 2 in series with a condenser 3 in the cathode return circuit. The cathode return circuit also includes resistances 4 and 5. Input to be amplified is applied from terminal 6 to the control grid by means of a condenser 7 and grid resistance 8, amplified output being taken off to the output terminal 9 from the anode through a condenser 10. The usual anode resistance is represented at 11 and the effective self capacity of the valve is conventionally represented in broken lines by the condenser 12.

With this well known circuit, the variable resistance 2 provides variable degeneration which increases, to reduce the gain of the stage, as the value of the resistance in the cathode return circuit is increased by moving the slider thereon. This circuit has, however, a defect which is especially serious for wide band amplifiers such as video amplifiers. This defect is that, as cathode degeneration is increased by increasing the value of resistance 2, the effective anode impedance of the valve is also increased and if the valve output impedance is comparable with the anode load there is substantial reduction of band width due to the effect of the stray capacity 12. The present invention seeks to avoid this defect.

According to this invention a variable gain amplifier comprises an amplifier valve having a feedback impedance connected in circuit therewith and means for varying the value of said impedance to vary the gain and simultaneously to vary an impedance included in a shunt path across said valve whereby the effective valve output impedance is maintained substantially constant during such variation.

In a preferred embodiment of the invention a variable gain amplifier comprises an amplifier valve, an impedance connected in a shunt path between the anode and cathode of said valve, an impedance in the cathode return circuit of said valve and a gain controlling variable tap on the first mentioned impedance and connected through a condenser to the end of the second mentioned impedance remote from the cathode.

In one circuit in accordance with the invention the valve cathode is returned to earth through a resistance, input signals to be amplified are applied between the grid of the valve and earth, output is taken from the anode of the valve through a condenser, a resistance is connected in series with said condenser between the anode and the cathode of said valve, and a variable tap on the last mentioned resistance is connected to earth through a further condenser. The cathode return circuit is non-resonant, i.e. its impedance does not vary with frequency within the broad band for which the amplifier is designed, and includes the resistance between cathode and earth, the resistance between the variable tap and the cathode, and the further condenser.

FIGURE 2 shows a preferred embodiment of the invention. Referring to this figure, input is applied to the valve 1 from terminals 6 by means of condenser 7 and grid resistance 8 and the cathode is returned to earth through two series resistances 41 and 51. Output is taken off from the anode through condenser 10 and a further condenser 101 to the output terminal 9. As before, the anode resistance is shown at 11 and the effective stray capacity of the valve is represented by the condenser 12. It will be seen, however, that instead of the adjustable resistance 2 of FIGURE 1, there is a potentiometer resistance 21 included effectively in shunt with the valve, being connected between the cathode of the valve and the junction point of the condensers 10 and 101. The slider 211 on this potentiometer resistance is connected to earth through a condenser 31.

With this arrangement, when the slider 211 is at the cathode end of the resistance 21, maximum stage gain is obtained, while in the opposite extreme setting of the slider 211 the anode of the valve is effectively de-coupled to earth and the stage gain is zero. In intermediate positions of the slider the part of the resistance 21 which is in series with the condenser 31 in the cathode return circuit determines the amount of cathode degeneration and this, and the effective load (which is reduced as the gain is reduced), determines the gain, but the remainder of the said resistance serves to prevent the effective impedance of the anode circuit of the valve increasing above that obtained at the setting for maximum gain. In practice, the effective impedance of the anode circuit of the valve remains sensibly constant over a considerable range of gain control.

A further advantage of the circuit of FIGURE 2 is that it is unnecessary, in order to achieve low stage gain, to make the resistance 21 of high value and accordingly loss of degeneration at high frequencies due to the shunting effect self capacity between the cathode of the valve and earth is substantially avoided. This advantage is, in many cases, an important one, since it means that the frequency response is never unduly peaked due to the effect of stray capacity between the cathode of the valve and earth, but in general the more important advantages are (1) that the band width never decreases at any setting of gain below that which is obtain at maximum gain and (2) the stage gain can be reduced right down to zero.

I claim:

1. A variable gain amplifier for amplifying signals in a broad band of frequencies comprising an amplifier valve having an anode, a cathode and a control grid, an anode circuit connected to said anode, a resistance having one end connected to the anode circuit and the other end connected to the cathode of said valve, and means for varying the gain of said amplifier independently of frequency, which means include a non-resonant cathode return circuit, said cathode return circuit including a movable gain controlling tap on said resistance, that portion of said resistance between said cathode and said tap, a condenser having one end connected to said tap and a resistance connected between said cathode and the other end of said condenser, whereby the effective valve output impedance is maintained substantially constant for each position of said tap for all frequencies within said broad band.

2. An amplifier according to claim 1 including means for applying signals to be amplified between the valve grid and earth, and means including a further condenser for taking output from the valve anode, said tap being connected to earth through said first mentioned condenser.

References Cited in the file of this patent

UNITED STATES PATENTS

| | | |
|---|---|---|
| 2,093,245 | Van Loon | Sept. 14, 1937 |
| 2,101,688 | Rechnitzer | Dec. 7, 1937 |
| 2,162,744 | Owendoff | June 20, 1939 |
| 2,224,699 | Rust | Dec. 10, 1940 |
| 2,273,143 | Roberts | Feb. 17, 1942 |
| 2,429,775 | Seright | Oct. 28, 1947 |
| 2,566,508 | Zeidler | Sept. 4, 1951 |
| 2,808,472 | Meewezen | Oct. 1, 1957 |
| 2,876,299 | Robins | Mar. 3, 1959 |